(12) United States Patent
Kim et al.

(10) Patent No.: US 11,329,340 B2
(45) Date of Patent: May 10, 2022

(54) BATTERY PACK HAVING BOTTOM CONNECTION TYPE TRAY AND METHOD OF MANUFACTURING THE SAME

(71) Applicant: LG Chem, Ltd., Seoul (KR)

(72) Inventors: Kyung Mo Kim, Daejeon (KR); Jeong Oh Moon, Daejeon (KR); Jung Hoon Lee, Daejeon (KR); Ho June Chi, Daejeon (KR); Jin Yong Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 282 days.

(21) Appl. No.: 16/500,032

(22) PCT Filed: Sep. 4, 2018

(86) PCT No.: PCT/KR2018/010286
§ 371 (c)(1),
(2) Date: Oct. 1, 2019

(87) PCT Pub. No.: WO2019/088438
PCT Pub. Date: May 9, 2019

(65) Prior Publication Data
US 2020/0176733 A1    Jun. 4, 2020

(30) Foreign Application Priority Data

Oct. 31, 2017    (KR) .................. 10-2017-0143721

(51) Int. Cl.
*H01M 50/20*    (2021.01)
*B60L 50/64*    (2019.01)
(Continued)

(52) U.S. Cl.
CPC ....... *H01M 50/20* (2021.01); *B29C 45/14467* (2013.01); *B60L 50/64* (2019.02);
(Continued)

(58) Field of Classification Search
None
See application file for complete search history.

(56) References Cited

U.S. PATENT DOCUMENTS 9,077,019 B2    7/2015    Kosaki et al.
9,472,791 B2    10/2016    Ojeda et al.
(Continued)

FOREIGN PATENT DOCUMENTS

CN    104393209 A    3/2015
CN    205863261 U    1/2017
(Continued)

OTHER PUBLICATIONS

Hwang et al. (KR20120081823) (Abstract) (Jul. 20, 2012) (Year: 2012).*

(Continued)

*Primary Examiner* — Carmen V Lyles-Irving
(74) *Attorney, Agent, or Firm* — Birch, Stewart, Kolasch & Birch, LLP

(57) ABSTRACT

A battery pack having a bottom connection type tray is provided. The battery pack includes a tray configured to load a plurality of battery modules therein, a plurality of tray terminals provided on a bottom plate of the tray, a connection wire for interconnecting the tray terminals or connecting the tray terminals to an external circuit, and a battery terminal provided in each of the battery modules to be connected to a corresponding one of the tray terminals. Terminal connection is achieved while the battery modules are assembled with the tray, and therefore, an assembly procedure is more easily performed, and the reliability of a terminal connection structure is improved. In addition, automated assembly and production using a robot are possible.

10 Claims, 6 Drawing Sheets

(51) Int. Cl.
  *B29C 45/14*    (2006.01)
  *H01M 50/502*   (2021.01)
  *B29L 31/34*    (2006.01)

(52) U.S. Cl.
  CPC ... *H01M 50/502* (2021.01); *B29L 2031/3468* (2013.01); *H01M 2220/20* (2013.01)

(56) References Cited

U.S. PATENT DOCUMENTS

| | | |
|---|---|---|
| 2013/0037336 A1 | 2/2013 | Ojeda et al. |
| 2013/0202936 A1 | 8/2013 | Kosaki et al. |
| 2017/0021712 A1 | 1/2017 | Leonard et al. |
| 2019/0036175 A1 | 1/2019 | Evans |

FOREIGN PATENT DOCUMENTS

| | | |
|---|---|---|
| CN | 107046115 A | 8/2017 |
| EP | 3 223 341 A1 | 9/2017 |
| JP | 6-181059 A | 6/1994 |
| JP | 09-084212 A | 3/1997 |
| JP | 2904-14258 A | 1/2004 |
| JP | 2006-286357 A | 10/2006 |
| JP | 2010-225435 A | 10/2010 |
| JP | 5321554 B2 | 10/2013 |
| JP | 5541100 B2 | 7/2014 |
| JP | 2015-82437 A | 4/2015 |
| KR | 10-2012-0081823 A | 7/2012 |
| KR | 10-2013-0140245 A | 12/2013 |
| KR | 10-2015-0019705 A | 2/2015 |
| KR | 10-2016-0069998 A | 6/2016 |
| WO | WO 2017/183012 A1 | 10/2017 |

OTHER PUBLICATIONS

Hwang et al. (KR20120081823) (Detailed Description & Drawings) (Jul. 20, 2012) (Year: 2012).*
Extended European Search Report, dated Jun. 19, 2020, for European Application No. 18871903.3.

* cited by examiner

BATTERY PACK HAVING BOTTOM CONNECTION TYPE TRAY AND METHOD OF MANUFACTURING THE SAME

CROSS-REFERENCES TO RELATED APPLICATIONS

This application is a U.S. national phase application, pursuant to 35 U.S.C. § 371, of PCT/KR2018/010286, filed Sep. 4, 2018, designating the United States, which claims priority to Korean Application No. 10-2017-0143721, filed Oct. 31, 2017. The entire contents of the aforementioned patent applications are incorporated herein by this reference.

TECHNICAL FIELD

The present invention relates to a battery pack used in electric vehicles or the like, and more particularly to a battery pack including a plurality of battery modules loaded in a tray and a method of manufacturing the same.

BACKGROUND ART

In general, secondary batteries, which can be charged and discharged to be repeatedly used, constitute a single battery module, which is used in small-sized portable electronic devices, such as cellular phones, laptop computers, personal computers, cameras, camcorders, and the like, or constitute a battery pack including a plurality of battery modules, which is used as a power source for a motor in high-power hybrid electric vehicles (HEV), high-power electric vehicles (EV), and the like.

In particular, electric vehicles use high-power electrical energy. For this reason, a considerably large number of battery modules are required for each vehicle. Consequently, battery modules are provided in a battery case in the state of being loaded on a support plate, such as a tray, in order to constitute a battery pack.

The battery modules loaded in the tray are electrically connected to each other via a connection wire, such as a wire harness. In addition, the battery modules are also connected to an external control circuit and to an external power supply circuit.

However, in most cases, the battery modules are manually loaded in the tray and the battery modules are also manually connected to each other using a wire. Therefore, there is a necessity for providing an assembly structure and process that are capable of more easily, conveniently, and efficiently connecting the battery modules loaded in the tray to each other using a wire harness and connection terminals.

DISCLOSURE

Technical Problem

The present invention has been made in view of the above problems and other technical problems to be resolved, and it is an object of the present invention to provide a battery pack having a bottom connection type tray and a method of manufacturing the same to achieve terminal connection while battery modules are loaded in a tray, whereby an assembly procedure is more easily performed, the reliability of a connection structure is improved, and automated assembly and production are possible.

Technical Solution

In accordance with an aspect of the present invention, the above and other objects may be accomplished by the provision of a battery pack having a bottom connection type tray, the battery pack including a tray configured to load a plurality of battery modules therein, a plurality of tray terminals provided on a bottom plate of the tray, a connection wire for interconnecting the tray terminals or connecting the tray terminals to an external circuit, and a battery terminal provided in each of the battery modules to be connected to a corresponding one of the tray terminals.

The tray terminals may be provided on the bottom plate of the tray to protrude upwards.

The tray terminals may be provided on the bottom plate of the tray to correspond to the respective battery modules.

Each of the tray terminals and a corresponding one of the battery terminals may be connected to each other using a connection structure having male and female connectors.

The tray terminals and the connection wire may be provided on a circuit plate having a planar structure, and the circuit plate may be coupled to the bottom plate of the tray.

The connection wire may be configured to be embedded in the tray.

The battery terminal may be provided in the lower surface of each of the battery modules.

In accordance with another aspect of the present invention, there is provided a method of manufacturing a battery pack, the method including a first step of providing a plurality of tray terminals on a bottom plate of a tray and installing, in the bottom plate of the tray, a connection wire for interconnecting the tray terminals or connecting the tray terminals to an external circuit, and a second step of loading a plurality of battery modules on the bottom plate of the tray to allow a battery terminal provided in each of the battery modules to be connected to a corresponding one of the tray terminals after the first step.

In the first step, the tray terminals may be provided on the bottom plate of the tray to protrude upwards.

In the first step, the connection wire may be provided in the tray using an insert injection method during injection molding of the tray.

In the first step, the tray terminals and the connection wire may be integrally provided on a circuit plate, and the circuit plate may be installed on a top of the tray.

In the second step, each of the tray terminals may be coupled to a corresponding one of the battery terminals by insertion when each of the battery modules is loaded.

The second step may include coupling each of the battery terminals and a corresponding one of the tray terminals to each other while disposing the battery modules in the tray using a robot, and therefore, the battery modules may be automatically assembled with the tray.

The principal technical solutions described above will be more concretely and definitely disclosed with reference to the following description of "mode for carrying out the invention" and the accompanying drawings. In addition to the principal technical solutions, various other technical solutions according to the present invention will be further provided and described.

Advantageous Effects

In a battery pack having a bottom connection type tray and a method of manufacturing the same according to the present invention, a battery module terminal connection structure is provided at the bottom plate of a tray to achieve terminal connection while battery modules are assembled with the tray, and therefore, an assembly procedure is more easily performed, and the reliability of a terminal connection structure is improved.

In addition, the terminal connection is achieved while the battery modules are loaded in the tray, and therefore, automated assembly and production using a robot are possible, and the productivity and yield of batteries are improved as the result of the automatic assembly and production.

MODE FOR CARRYING OUT THE INVENTION

Figure 1:
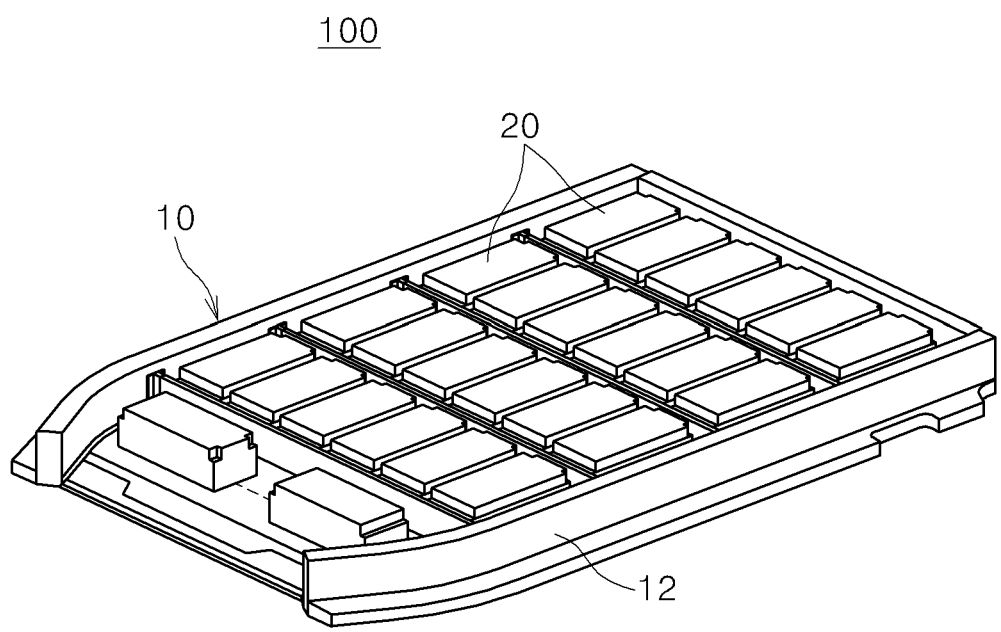
FIG. 1 is a perspective view showing a battery pack according to a first embodiment of the present invention.

Hereinbelow, preferred embodiments of the present invention will be described in detail with reference to the accompanying drawings.

In describing various embodiments of the present invention with reference to the drawings, the same or similar components will be denoted by the same reference numerals, and a duplicate description thereof will be omitted if possible.

Figure 2:
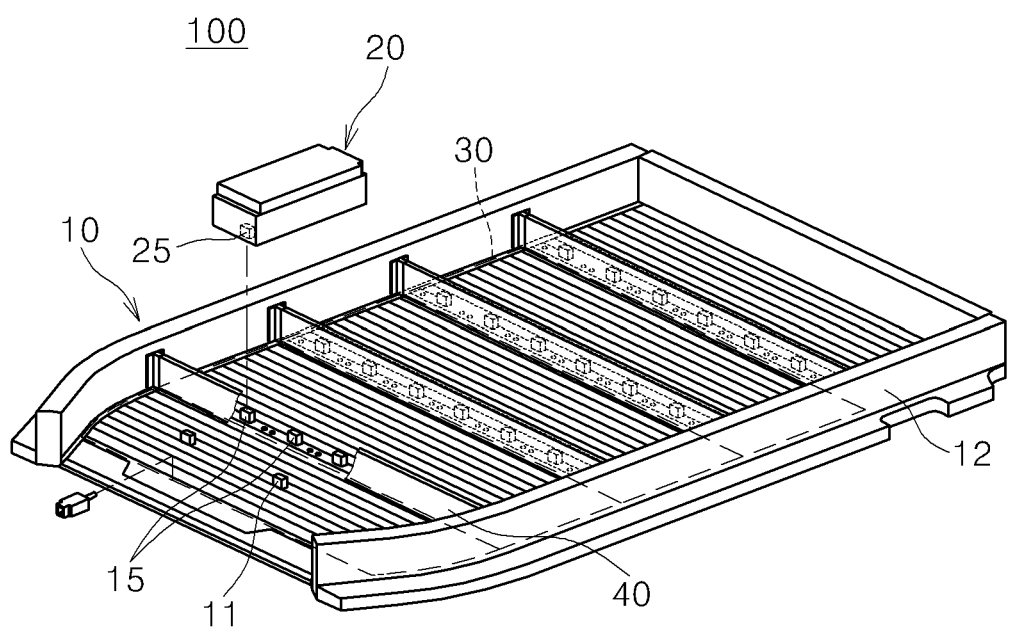
FIG. 2 is an exploded perspective view showing the battery pack according to the first embodiment of the present invention.
Figure 3:
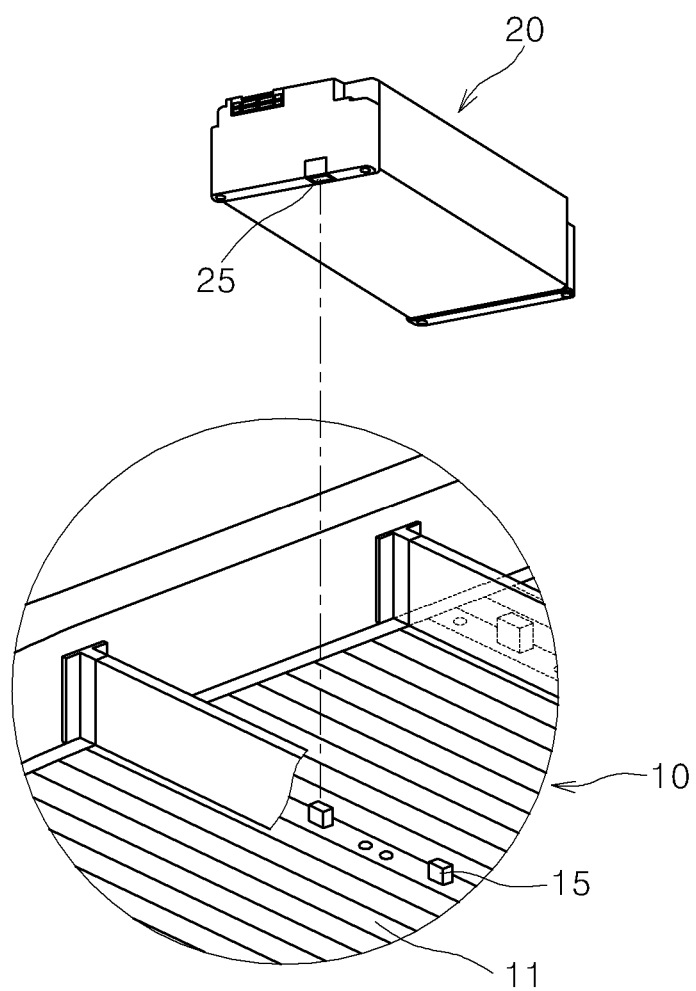
FIG. 3 is a detailed view showing the main components of the battery pack according to the first embodiment of the present invention.
Figure 4:
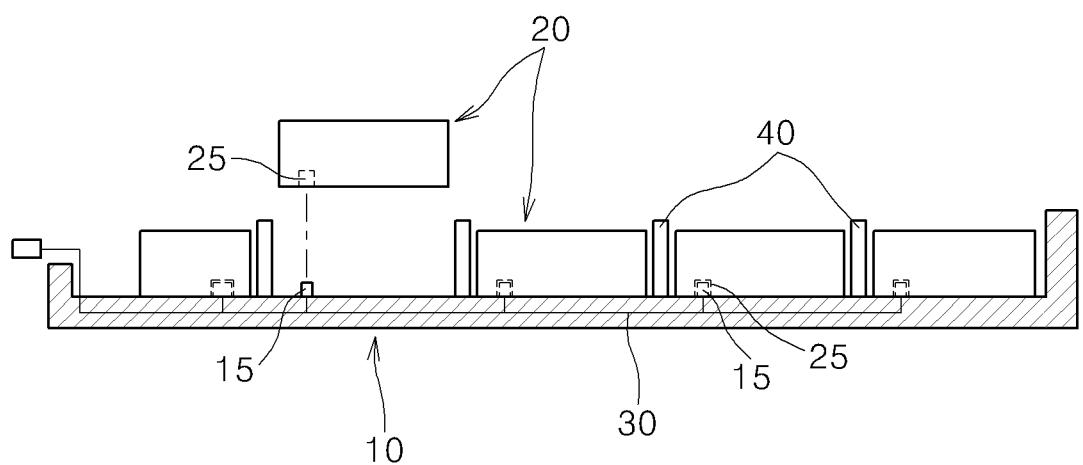
FIG. 4 is a longitudinal cross-sectional view showing the structure of the battery pack according to the first embodiment of the present invention.

FIGS. 1 to 4 are views showing a battery pack according to a first embodiment of the present invention. In particular, FIG. 1 is a perspective view of the battery pack, FIG. 2 is a partially exploded perspective view of the battery pack, FIG. 3 is a detailed view showing the main components of the battery pack, and FIG. 4 is a longitudinal cross-sectional view showing the structure of the battery pack. For reference, only one battery module is shown in FIG. 2 for the sake of convenience.

Referring to FIG. 1, the battery pack 100 according to the first embodiment of the present invention, includes a tray 10, a plurality of battery modules 20 loaded in the tray 10, and a connection wire 30 for interconnecting the battery modules 20 or connecting the battery modules 20 to external circuits.

The tray 10 may be configured to have a structure in which the bottom plate of the tray 10 is planar and in which a wall 12 having a predetermined height is formed along the edge of the tray 10 to protrude upwards.

The tray 10 may be configured to allow an external structure, such as a battery cover (not shown), to be mounted on the tray 10 with the battery modules 20 loaded in the tray 10.

The tray 10 shown in the figure is merely an example. Depending on implementations, the structure and shape of the tray 10 may be variously changed, as long as the tray 10 is configured to have a structure that is capable of supporting the battery modules 20 with the battery modules 20 loaded in the tray 10.

Referring to FIG. 2, the connection wire 30, which is connected to the battery modules 20, is formed on a bottom plate 11 of the tray 10.

The connection wire 30 may be configured to have a wire harness structure, and may serve to connect the battery modules 20 to external circuits, such as a battery management system (BMS) and a battery disconnection unit (BDU).

Referring to FIG. 4, in this embodiment, the connection wire 30 is configured to be embedded in the bottom plate 11 of the tray 10. The connection wire 30 may be embedded in the bottom plate 11 of the tray 10 using an insert injection method during injection molding of the tray 10.

The circuit structure of the connection wire 30 may be appropriately configured in consideration of the arrangement of the battery modules 20 loaded in the tray 10.

Hereinafter, the structure in which the battery modules 20 are connected to the connection wire 30 disposed in the tray 10 will be described.

Tray terminals 15 are formed on the bottom plate 11 of the tray 10 to protrude upwards.

The tray terminals 15 are configured to be electrically connected to the connection wire 30 disposed in the bottom plate 11 of the tray 10.

The tray terminals 15 are exposed on the bottom plate 11 of the tray 10 to correspond to the respective battery modules 20. In other words, when the battery modules 20 are arranged on the top of the tray 10 in the longitudinal direction and in the transverse direction, as illustrated in the figure, the tray terminals 15 protrude to correspond to the battery modules 20 one to one or one to more, as necessary, in the longitudinal direction and in the transverse direction.

Each of the battery modules 20 has therein a battery terminal 25, which is connected to a corresponding one of the tray terminals 15.

Referring to FIG. 3, the battery terminal 25 may be formed in the lower plate of each of the battery modules 20, and the tray terminals 15 may be formed on a top surface of the bottom plate of the tray 10 such that, when the battery modules 20 are loaded in the tray 10, the battery terminals 25 are coupled and connected to the respective tray terminals 15.

The connection between each of the tray terminals 15 and a corresponding one of the battery terminals 25 may be achieved using a connection structure having male and female connectors. In other words, each of the tray terminals 15 may be formed to have the shape of a protruding connector, and a corresponding one of the battery terminals 25 may be formed to have the shape of a recessed connector, into which the tray terminal 15 is inserted. Therefore, when the battery modules 20 are loaded in the tray 10, the tray terminals 15 may be inserted into the respective battery terminals 25 to allow the tray terminals 15 and the battery terminals 25 to be electrically connected to each other.

Alternatively, each of the tray terminals 15 may be formed to have the shape of a recessed connector, and a corresponding one of the battery terminals 25 may be formed to have the shape of a protruding connector.

The tray terminals 15 and the battery terminals 25 may be electrically connected to each other using various well-known electrical connection structures other than the above-described connection structure.

Meanwhile, support members 40 may be formed at the top of the tray 10 to be disposed between the battery modules 20 in order to stably maintain the state in which the battery modules 20 are loaded in the tray 10. As illustrated in the figure, the support members may be formed to extend along the transverse direction or along the longitudinal direction depending on the arrangement structure of the battery modules 20.

In addition, a plurality of protrusions or ribs may be formed on the bottom plate 11 of the tray 10 in order to maintain the state in which the battery modules 20 are stably loaded in the tray without moving.

A method of manufacturing the battery pack according to the first embodiment of the present invention, constructed as described above, will be described with reference to FIGS. 1 to 4.

First, a plurality of tray terminals 15 is formed on the bottom plate of a tray 10, and a connection wire 30 for interconnecting the tray terminals 15 or connecting the tray terminals 15 to external circuits is formed in the bottom plate of the tray 10.

In particular, the connection wire 30 may be embedded in the tray 10 when the tray 10 is manufactured using an injection molding method. In other words, when the tray 10 is injection-molded, the connection wire 30, which is configured to have a wire harness structure, is formed in the tray 10 using an insert injection method. Of course, when the connection wire 30 is formed by insert injection, the portions of the connection wire 30 to be connected to the tray terminals 15 are exposed. In addition, the tray terminals 15 are arranged on the bottom plate of the tray 10, in which the connection wire 30 is formed, to protrude upwards.

Subsequently, a plurality of battery modules 20 are loaded on the bottom plate of the tray 10 to be assembled with the tray 10. In particular, a battery terminal 25 formed in each of the battery modules 20 is connected to a corresponding one of the tray terminals 15 to electrically connect the battery modules to the tray.

Each of the tray terminals 15 and a corresponding one of the battery terminals 25 are connected to each other using a connection structure having male and female connectors such that, when the battery modules 20 are loaded into the tray 10, one of a pair of terminals to be connected to each other is inserted and coupled into the other terminal.

According to the assembly and manufacturing method described above, a battery pack may be manufactured as a worker connects corresponding terminals to each other while loading the battery modules 20 into the tray 10.

Alternatively, when the tray terminals 15 are exposed on the bottom plate of the tray 10, and the battery terminals 25 are formed in the lower surfaces of the battery modules 20, the battery modules 20 may be loaded into the tray 10 using an automated assembly machine. Accordingly, the terminal connection is automatically achieved, and therefore, it is possible to manufacture a battery pack.

According to the present invention, therefore, it is possible to manufacture a battery pack through an automated process using an assembly robot, in which the robot picks up the battery modules 20 and places the battery modules 20 in the tray 10 such that the terminal connection is automatically achieved, instead of the worker arranging the battery modules and connecting corresponding terminals to each other.

Figure 5:
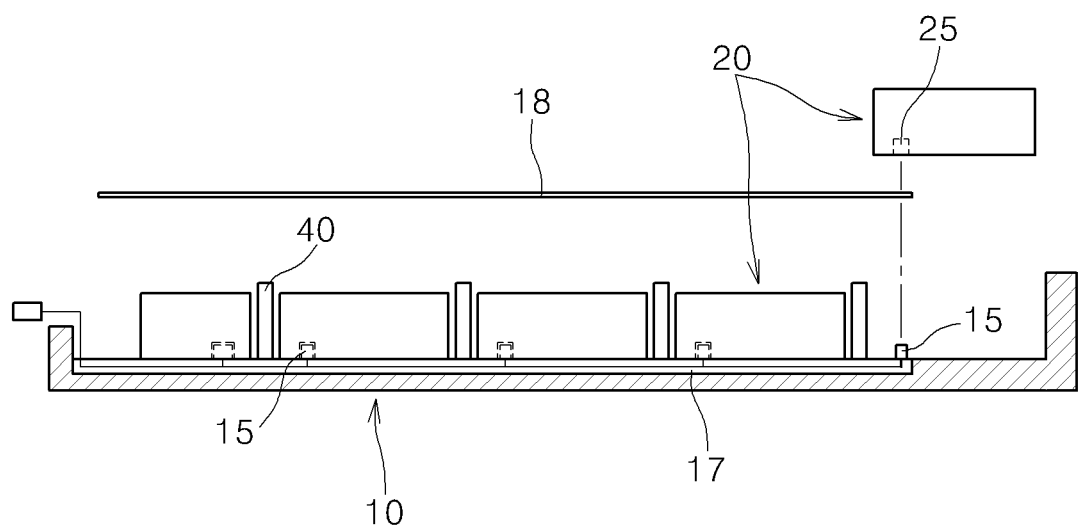
FIG. 5 is a longitudinal cross-sectional view showing the structure of a battery pack according to a second embodiment of the present invention.

FIG. 5 is a longitudinal cross-sectional view showing the structure of a battery pack according to a second embodiment of the present invention.

The battery pack according to the second embodiment of the present invention is identical or similar in structure to the battery pack according to the first embodiment of the present invention as described above, except for the structure in which the connection wire 30 is installed.

Referring to FIG. 5, in this embodiment, the connection wire 30 may be not embedded in the tray 10, but a wire groove 17 may be formed in the bottom plate of the tray 10 to correspond to the connection wire 30 such that the connection wire 30 is inserted into the wire groove 17.

A wire cover 18 may be provided on the wire groove 17. After the connection wire 30 is inserted into the wire groove 17, the wire groove 17 is covered by the wire cover 18.

The wire groove 17, formed in the bottom plate of the tray 10, may be designed and configured correspondingly depending on the structure in which the battery pack 100 is disposed and the connection method using the connection wire 30.

Other components of the battery pack according to the second embodiment of the present invention are identical or similar in structure to the battery pack according to the first embodiment of the present invention as described above, and therefore a duplicate description thereof is omitted, and the same components are denoted by the same reference numerals.

Figure 6:
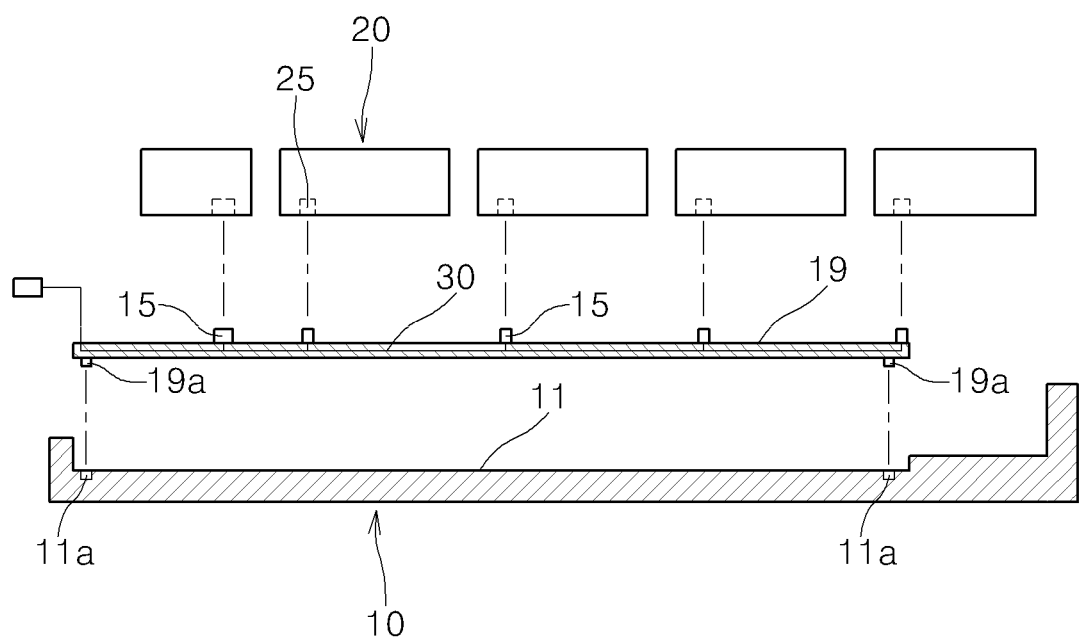
FIG. 6 is a longitudinal cross-sectional view showing the structure of a battery pack according to a third embodiment of the present invention.

FIG. 6 is a longitudinal cross-sectional view showing the structure of a battery pack according to a third embodiment of the present invention.

The battery pack according to the third embodiment of the present invention is identical or similar in structure to the battery pack according to the first embodiment of the present invention as described above, except for the structure in which the tray terminals 15 and the connection wire 30 are installed.

Referring to FIG. 6, in this embodiment, the tray terminals 15 and the connection wire 30 are integrally formed with a circuit plate 19 having a planar structure, and the circuit plate 10 is coupled to the bottom plate of the tray 10. The circuit plate 19 may be formed to have the shape of a plane having a small thickness. The connection wire 30 and the tray terminals 15 may be integrally formed with the circuit plate 19 using an assembly method or an insert injection method.

The circuit plate 19 may be configured to have a planar structure or a lattice structure. When the circuit plate 19 is configured in a planar structure, the connection wire may be printed on the circuit plate and the tray terminals may be formed on the circuit plate to protrude upwards, in the same manner as in a general printed circuit board. When the circuit plate 19 is configured to have a lattice structure, protective layers may be formed only on the portions of the circuit plate at which the connection wire 30 and the tray terminals 15 are disposed.

The circuit plate 19, configured as described above, is coupled to the tray 10 before the battery modules 20 are assembled with the tray 10. In particular, the circuit plate 19 may be coupled to the bottom plate of the tray 10. For example, protrusions 19a may be formed on the circuit plate 19 and recesses 11a may be formed in the tray 10 to allow each of the protrusions 19a to be inserted into a corresponding one of the recesses 11a, and therefore, the circuit plate 19 is assembled with the tray 10.

In the same manner as in the first embodiment of the present invention as described above, the battery modules 20 are loaded in the tray 10, with which the circuit plate 19 has been assembled, in order to manufacture a battery pack 100.

Technical ideas described with reference to the above-described embodiments of the present invention may be embodied independently or in a combined state. In addition, although the present invention has been described with reference to the embodiments disclosed in the drawings and the detailed description of the invention, the embodiments are merely illustrative. Those skilled in the art to which the present invention pertains will appreciate that various modifications and other equivalent embodiments may be made from the embodiments described above. Therefore, the technical protection scope of the present invention is to be defined by the appended claims.

The invention claimed is:

1. A battery pack comprising:
   a tray including:
      a bottom plate accommodating a plurality of battery modules and including a plurality of tray terminals; and
      a wall formed along an edge of the tray and protruding in a first direction; and
   a connection wire for interconnecting the tray terminals or connecting the tray terminals to an external circuit,
   wherein each battery terminal is connected to a corresponding one of the tray terminals by assembling, in a second direction opposite to the first direction, each respective battery module to the bottom plate of the tray and within a space formed by the wall, and
   wherein the tray further comprises a plurality of support members formed on a top surface of the tray between sides of the wall and disposed between a group of battery modules among the plurality of battery modules, and
   wherein the tray terminals are provided on the bottom plate of the tray to correspond to the respective battery modules and protrude upwards in the first direction.

2. The battery pack according to claim 1, wherein each of the tray terminals and a corresponding one of the battery terminals are connected to each other using a connection structure having male and female connectors.

3. The battery pack according to claim 1, wherein the tray terminals and the connection wire are provided on a circuit plate having a planar structure, and
   wherein the circuit plate is coupled to a top surface of the bottom plate of the tray.

4. The battery pack according to claim 1, wherein the connection wire is embedded in the bottom plate of the tray.

5. The battery pack according to claim 1, wherein the battery terminal is provided in a lower surface of each of the battery modules facing the tray.

6. A method of manufacturing a battery pack, the method comprising:
   a first step of providing a plurality of tray terminals on a bottom plate of a tray and installing, in the bottom plate of the tray, a connection wire for interconnecting the tray terminals or connecting the tray terminals to an external circuit, the tray including a wall formed along an edge of the tray and protruding in a first direction; and then
   a second step of loading, in a second direction opposite to the first direction, a plurality of battery modules on the bottom plate of the tray within a space formed from the wall to accommodate the plurality of battery terminals to the tray to connect a battery terminal provided in each of the battery modules to a corresponding one of the tray terminals,
   wherein the tray further comprises a plurality of support members formed on a top surface of the tray between sides of the wall and disposed between a group of battery modules among the plurality of battery modules, and
   wherein, in the first step, the tray terminals are provided on the bottom plate of the tray to correspond to the respective battery modules and protrude upwards in the first direction.

7. The method according to claim 6, wherein, in the first step, the connection wire is provided in the tray using an insert injection method during injection molding of the tray.

8. The method according to claim 6, wherein, in the first step, the tray terminals and the connection wire are integrally provided on a circuit plate, and the circuit plate is installed on a top of the tray.

9. The method according to claim 6, wherein, in the second step, each of the tray terminals is coupled to a corresponding one of the battery terminals when each of the battery modules is loaded onto the bottom tray.

10. The method according to claim 6, wherein the second step comprises coupling each of the battery terminals and a corresponding one of the tray terminals to each other while disposing the battery modules in the tray using a robot, whereby the battery modules are automatically assembled with the tray.

* * * * *